US007617310B2

(12) United States Patent
Reitmeier et al.

(10) Patent No.: US 7,617,310 B2
(45) Date of Patent: Nov. 10, 2009

(54) SYSTEM FOR OPERATING ESPECIALLY FOR REMOTE CONTROLLING AND TELEMONITORING, UNMANNED RADIO TRANSMITTERS

(75) Inventors: Manfred Reitmeier, Landshut (DE); Hermann Sammer, Freyung (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 671 days.

(21) Appl. No.: 10/362,294

(22) PCT Filed: Aug. 21, 2001

(86) PCT No.: PCT/EP01/09671

§ 371 (c)(1),
(2), (4) Date: Feb. 21, 2003

(87) PCT Pub. No.: WO02/19629

PCT Pub. Date: Mar. 7, 2002

(65) Prior Publication Data

US 2003/0169717 A1 Sep. 11, 2003

(30) Foreign Application Priority Data

Aug. 31, 2000 (DE) .............................. 100 42 934

(51) Int. Cl.
*G06F 15/173* (2006.01)
(52) U.S. Cl. ....................... 709/224; 709/223; 370/338; 370/339
(58) Field of Classification Search ......... 709/223–225; 370/338, 339
See application file for complete search history.

(56) References Cited

U.S. PATENT DOCUMENTS

| 5,931,911 | A | | 8/1999 | Remy et al. | |
|---|---|---|---|---|---|
| 5,961,594 | A | | 10/1999 | Bouvier et al. | |
| 6,085,248 | A | * | 7/2000 | Sambamurthy et al. | ..... 709/229 |
| 6,437,692 | B1 | * | 8/2002 | Petite et al. | ................. 340/540 |
| 6,501,463 | B1 | * | 12/2002 | Dahley et al. | ............... 345/173 |

(Continued)

FOREIGN PATENT DOCUMENTS

DE 196 51 244 A1 6/1998

(Continued)

OTHER PUBLICATIONS

HF Radio in the International Information Infrastructure, Eric E. Jhonson, Nordic Shortwave Conference, HF95, Faro, Sweden, 1995, (citeseer).*

(Continued)

*Primary Examiner*—Nathan J Flynn
*Assistant Examiner*—Mohammad A Siddiqi
(74) *Attorney, Agent, or Firm*—Caesar, Rivise, Bernstein, Cohen & Pokotilow, Ltd.

(57) ABSTRACT

The invention relates to remote controlling and telemonitoring an unmanned radio transmitter (1), which can be controlled from a center if required. The center is connected to the remote-controlled transmitters via a public or private network and the operational functions of the transmitter are, if required, remote-controlled or interrogated by the center, according to the HTTP protocol, via a connection to a server/browser network linked to the remote-control device; simultaneously, the operational functions are automatically transmitted, without a prompt, from the transmitter to the centre (2) via a checkback network connection according to the SNMP- or HTTP-principle.

10 Claims, 2 Drawing Sheets

U.S. PATENT DOCUMENTS

| | | | |
|---|---|---|---|
| 6,854,010 B1 * | 2/2005 | Christian et al. | 709/223 |
| 6,925,069 B2 * | 8/2005 | Koos et al. | 370/334 |
| 6,946,974 B1 * | 9/2005 | Racunas, Jr. | 340/932.2 |
| 7,010,594 B2 * | 3/2006 | Defosse | 709/224 |
| 7,013,337 B2 * | 3/2006 | Defosse et al. | 709/224 |
| 7,020,532 B2 * | 3/2006 | Johnson et al. | 700/89 |
| 7,082,528 B2 * | 7/2006 | Zaudtke et al. | 713/2 |

FOREIGN PATENT DOCUMENTS

| | | |
|---|---|---|
| DE | 198 08 616 A1 | 9/1998 |
| DE | 197 31 026 A1 | 1/1999 |
| DE | 693 27 777 T2 | 6/2000 |
| DE | 199 04 331 C1 | 8/2000 |
| EP | 0 851 695 A2 | 7/1998 |
| EP | 0 928 121 A2 | 7/1999 |
| WO | WO 99/43174 A1 | 8/1999 |
| WO | WO 00/38449 A1 | 6/2000 |

OTHER PUBLICATIONS

XP-000737532, Park et al, "Performance Analysis of the Network Management Protocol in the CDMA PCS Network", IEEE Global Telecommunications Conference, published Nov. 3, 1997.

Evensen, "Intenet-Protokolle—bereit für den Fabrikeinsatz" Heft 20/1999.

Pfitzner, "Langzeitüberwachung von Höfunk—und TV-Sendern", Heft 154 (Nov. 1997).

Barelmann, "Über Internet: Prozesse beobachten und Anlagenberichte lesen", Heft 20/1997.

"Auch für Messungen über Intranet und Internet", elektrotechnik für die Automatisierung Nov. 5, 1998.

* cited by examiner

SYSTEM FOR OPERATING ESPECIALLY FOR REMOTE CONTROLLING AND TELEMONITORING, UNMANNED RADIO TRANSMITTERS

BACKGROUND OF THE INVENTION

The invention relates to a system for remote controlling and telemonitoring unmanned radio transmitters.

It is known to operate radio-transmitting stations unmanned, i.e. without operating staff at the site of the transmitter, and to provide a remote control device in the transmitter that continuously monitors the operation of the transmitter and, if necessary, can be remote-controlled from the centre. A large number of radio transmitters can be operated centrally, remote-controlled and maintained with such a known system (according to DIN IEC 864, February 1989: "Standardization of interconnections between transmitters or transmitting systems and supervisory equipment", page 4). In that case, the individual radio transmitters are generally connected via dedicated lines to the centre. Said known systems are relatively complicated and expensive.

The object of the invention is therefore to provide such a system for operating unmanned radio transmitters that is substantially simpler and makes complicated special connections between the transmitters and the centre superfluous.

SUMMARY OF THE INVENTION

Accordingly, the invention provides a system for operating, in particular for remote controlling and telemonitoring, of unmanned radio transmitters, which each have remote-control devices via which the operating functions of the transmitter are continuously monitored and, if necessary, can be remote-controlled from a center, characterized in that the center is connected to the remote-controllable transmitters via a public or private network, and the operating functions of the transmitter can, if necessary, be interrogated and remote-controlled by the center via a server/browser network connection according to the HTTP protocol connected to the remote-control device, and are transmitted automatically and without prompting by the transmitter to the center via a checkback network connection (SNMP or HTTP).

In accordance with the invention, a public or private network, for example a so-called local area network (LAN) or wide area network (WAN), such as those now available worldwide in the most varied embodiments, is used for the connection between the individual transmitters and the centre. To interrogate the operating functions of the transmitter, only a standard Internet browser is necessary in the centre and an associated server in the transmitters in order to interrogate, if necessary, the desired operating functions of the transmitter according to the HTTP protocol (Hypertext Transfer Protocol). Simultaneously, certain operating functions of the transmitter are continuously transmitted to the centre automatically and without prompting via the checkback network connection that is additionally also provided and that operates, for example, according to the SNMP protocol (Simple Network Management Protocol) or which has for that purpose an additional client/server return connection employing the HTTP protocol so that any malfunctions in the transmitter are immediately detected and indicated in the centre and can then be eliminated immediately via the existing remote-control connection (browser/server of the HTTP connection or, if an SNMP connection is used as checkback network connection immediately by the latter). The browser can also be used in a decentralized manner for interrogating if necessary the operating conditions by assigning it, for example, to the maintenance staff that is underway in a mobile manner and is appropriately informed in the event of faults via the centre.

The system according to the invention can be applied in any desired radio transmitters, both in the case of radio transmitters and in the case of mobile radio transmitters, it being possible not only for the operating functions of the transmitter to be interrogated and remote-controlled, but, for example, also associated measuring instruments that are assigned to the transmitter system and that can likewise be interrogated and remote-controlled via the remote-controlled device of the transmitter. The system according to the invention can also be applied in a similar way for other remote-controllable devices for which similar requirements exist as in the case of such radio transmitters.

BRIEF DESCRIPTION OF SEVERAL VIEWS OF THE DRAWINGS

The invention is explained in greater detail below using diagrammatic drawings with reference to two exemplary embodiments.

DETAILED DESCRIPTION OF PREFERRED EMBODIMENTS

Figure 1:
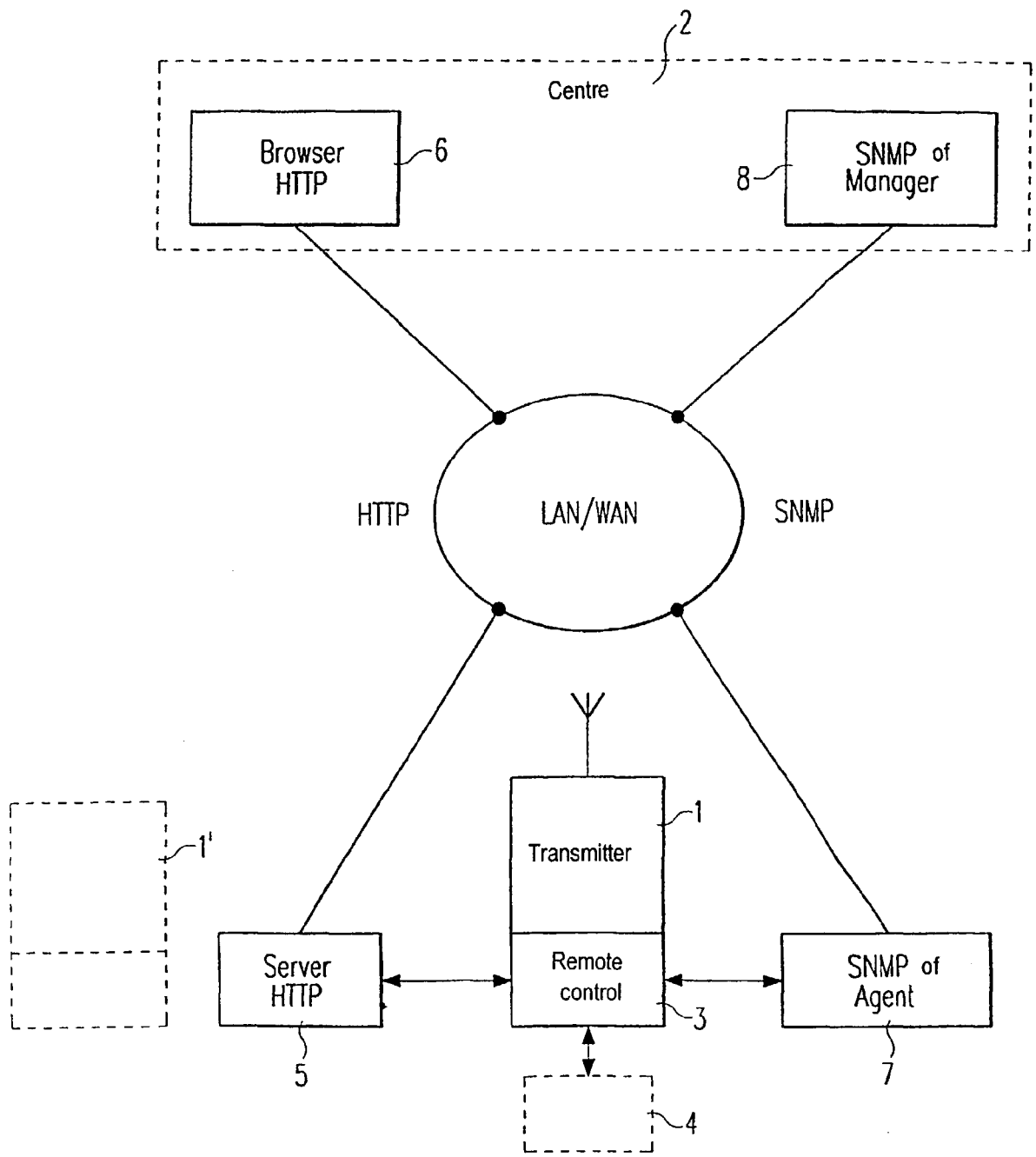
FIG. 1 shows a basic circuit diagram of a first embodiment of an operating system of the invention.

FIG. 1 shows the basic circuit diagram of an operating system according to the invention for unmanned transmitters, of which, for the sake of clarity, only a single transmitter 1 is shown. A multiplicity of such transmitters can, of course, be remote-controlled in the same way by the principle according to the invention from a centre 2, as is indicated by the transmitter 1'. The transmitter 1 can be remote-controlled in a manner known per se, i.e. its operating functions and any measuring instruments 4 assigned to it can be continuously monitored by means of a remote-control device 3 and, if necessary, remote-controlled from the centre 2, by means of said remote-control device 3, as is described in greater detail, for example, in the reference DIN IEC 864 mentioned at the outset. The remote-control device 3 is connected via a public network LAN/WAN to the centre 2 and, specifically, via a network employing the HTTP protocol having a server 5 that is connected to the remote-control device 3 and a browser 6 that is disposed in the centre 2 or is optionally also sited in a decentralized manner. The server 5 is preferably integrated (embedded) with the remote-control device 3 to form a unit. The operating conditions of the transmitter 1 are stored in a memory, not shown in greater detail, as web pages according to the XML standard and can accordingly be read out via the server 5 and fed into the public network LAN/WAN via a suitable network interface and transmitted to the browser 6 according to the HTTP protocol and displayed there, for example, on a viewing screen as soon as the browser transmits an appropriate HTTP interrogation command via the network to the server 5. This interrogation and control system employing the HTTP system is described in greater detail, for example, in the "Request for Comments" RFC 2026, RFC 2616. Simultaneously, the remote control 3 is also connected according to the SNMP protocol via the public network LAN/WAN to the centre 2, as is described in greater detail, for example, in RFC 1089 and RFC 1067. For this purpose, the remote control 3 is assigned an SNMP agent 7 that is preferably again integrated directly with the remote control 3 like the server 5. Said SNMP agent 7 is in communication with an SNMP manager 8 disposed in the centre 2 via the public network. The operating functions of the transmitter 1 whose instruction repertoire is defined in the "management information base" can be continuously transmitted to the centre via this second continuously operating SNMP connection and the function of the transmitter can therefore be continuously monitored in the centre. In some cases it is often sufficient not to provide any continuous transmission of operating functions to the centre, but only if troublesome deviations in said operating functions occur in the transmitter. The latter are then signalled without prompting to the centre by the so-called SNMP traps. The remote-control device 3 can also be acted on directly by the SNMP manager from the centre via said SNMP protocol and the operating function of the transmitter can consequently be remote-controlled.

Figure 2:
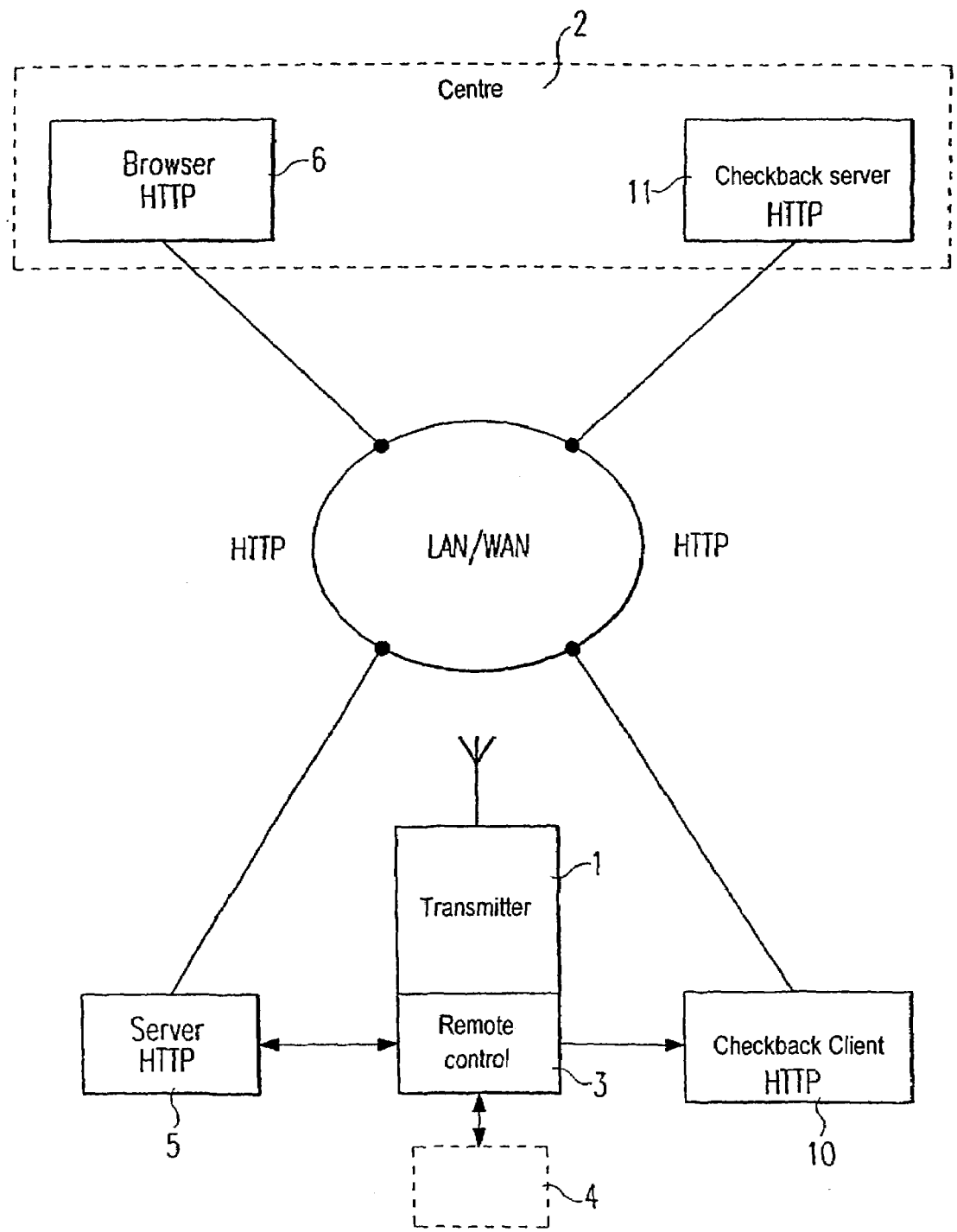
FIG. 2 shows a basic circuit diagram of a second embodiment of an operating system of the invention.

FIG. 2 shows a further possibility for the construction of the checkback network connection. The system for interrogating the operating conditions if necessary is via HTTP with server 5 and browser 6, as in accordance with FIG. 1. Instead of the SNMP system for the continuous checkback, the HTTP protocol is likewise used in accordance with FIG. 2. For this purpose, the remote-control device 3 is assigned a checkback client 10, preferably again integrated with the remote-control device and the server 5, which is connected to a checkback server 11 in the centre via the LAN/WAN network. If, for example, a fault occurs in an operating function in the transmitter or, possibly, it also occurs periodically with time at certain intervals, the checkback client 10 dials, in accordance with the HTTP protocol, the IP address (identification number) associated with the checkback server 11 and then transmits automatically and independently without prompting the respective operating functions of the transmitter 1, which are fed to the checkback client 10 via the remote-control device 3, to the checkback server 11 and are evaluated there and initiate, for example, a visual or audible alarm so that the centre can then request via the browser/server connection 6, 5, either more detailed information items about the operating fault and can then act directly on the operating functions by remote control in order to eliminate any irregularities or faults in the operating functions.

The protocols to be transmitted via the public network can be encoded in a known manner in order to prevent external interference.

The server/browser connection employing the HTTP protocol is of a known type. Suitable for this purpose, for example, is the Internet explorer offered by MICROSOFT or the navigator offered by NETSCAPE. Suitable as SNMP system is, for example, the system HP Open View offered by HEWLETT PACKARD, the Spectrum system or the MG Soft system.

What is claimed is:

1. A system for remotely controlling and monitoring a radio broadcast transmitter of a radio-transmitting station according to the DIN IEC 864 standard, said system comprising a remote-control device through which operating functions of the broadcast transmitter of the radio-transmitting station according to the DIN IEC 864 standard are continuously monitored and remote-controlled from a center located remote from the broadcast transmitter, the radio broadcast transmitter of the radio-transmitting station according to the DIN IEC 864 standard broadcasts a radio signal as a primary mode of communication, the center including an Internet browser and being connected to the broadcast transmitter through a public or private network different than the primary mode of communication by: (a) a first connection comprising the Internet browser of the center communicating through the network to an Internet server connected to the remote control device of the broadcast transmitter, such that the operating functions of the broadcast transmitter are interrogated and remote controlled according to HTTP protocol; and (b) a second checkback connection comprising: one of (i) an SNMP manager in the center communicating through the network to an SNMP agent connected to the remote-control device of the broadcast transmitter, and (ii) an Internet server in the center communicating through the network by HTTP to an Internet client assigned to the remote-control device of the broadcast transmitter, wherein the operating functions of the broadcast transmitter are transmitted automatically from the broadcast transmitter to the center via the second checkback connection without prompting from the center, the operating functions of the broadcast transmitter are transmitted via the second checkback connection to the center only in the event of interfering deviations in the operating functions, and the Internet server is embedded with the remote-control device of the broadcast transmitter to form a unit.

2. The system according to claim 1, wherein the operating functions of the broadcast transmitter are stored according to XML standard on a web page in the Internet server of the first connection and can be interrogated and displayed according to the HTTP protocol by the Internet browser.

3. The system according to claim 1, wherein the operating functions of the broadcast transmitter are also remote-controlled via the second checkback connection employing the SNMP protocol.

4. The system according to claim 1, wherein the SNMP agent of the second checkback connection and/or the Internet client of the second connection are integrated with the remote-control device of the broadcast transmitter to form a unit.

5. The system according to claim 1, wherein the network is public and transmissions through the network are encoded.

6. The system according to claim 1, wherein data is transmitted wirelessly by means of WAP protocol from the Internet server to a user Internet client.

7. The system according to claim 1, wherein the Internet browser of the first connection is used in a decentralized manner.

8. The system according to claim 1, wherein the broadcast transmitter is configured for broadcasting over a wide area as a primary method of communication, and transmits its operating functions to the center via the second checkback connection separate from and independent of the primary method of communication.

9. The system according to claim 1, wherein the second checkback connection includes the SNMP manager in the center communicating through the network to the SNMP agent connected to the remote-control device of the broadcast transmitter.

10. The system according to claim 1, wherein the second checkback connection includes the Internet server in the center communicating through the network by HTTP to the Internet client assigned to the remote-control device of the broadcast transmitter.

* * * * *

UNITED STATES PATENT AND TRADEMARK OFFICE
CERTIFICATE OF CORRECTION

PATENT NO. : 7,617,310 B2  Page 1 of 1
APPLICATION NO. : 10/362294
DATED : November 10, 2009
INVENTOR(S) : Reitmeier et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 847 days.

Signed and Sealed this

Fourteenth Day of December, 2010

David J. Kappos
*Director of the United States Patent and Trademark Office*